US011936661B2

United States Patent
Jang et al.

(10) Patent No.: US 11,936,661 B2
(45) Date of Patent: *Mar. 19, 2024

(54) DETECTING MALICIOUS BEACONING COMMUNITIES USING LOCKSTEP DETECTION AND CO-OCCURRENCE GRAPH

(71) Applicant: Kyndryl, Inc., New York, NY (US)

(72) Inventors: Jiyong Jang, White Plains, NY (US); Dhilung Hang Kirat, White Plains, NY (US); Bum Jun Kwon, College Park, MD (US); Douglas Lee Schales, Ardsley, NY (US); Marc Philippe Stoecklin, White Plains, NY (US)

(73) Assignee: Kyndryl, Inc., New York, NY (US)

( * ) Notice: Subject to any disclaimer, the term of this patent is extended or adjusted under 35 U.S.C. 154(b) by 683 days.

This patent is subject to a terminal disclaimer.

(21) Appl. No.: 17/137,595

(22) Filed: Dec. 30, 2020

(65) Prior Publication Data

US 2021/0120012 A1 Apr. 22, 2021

Related U.S. Application Data

(63) Continuation of application No. 15/626,767, filed on Jun. 19, 2017, now Pat. No. 10,887,323.

(51) Int. Cl.
*H04L 9/40* (2022.01)
*G06F 21/55* (2013.01)

(52) U.S. Cl.
CPC ........ *H04L 63/1408* (2013.01); *G06F 21/552* (2013.01); *H04L 63/1416* (2013.01);
(Continued)

(58) Field of Classification Search
CPC ............ H04L 63/1408; H04L 63/1416; H04L 63/1425; H04L 63/1441; H04L 2463/144; G06F 21/552
See application file for complete search history.

(56) References Cited

U.S. PATENT DOCUMENTS 7,299,291 B1 * 11/2007 Shaw .................. H04L 67/1001
709/227
8,127,357 B1 * 2/2012 Phoha ................. H04L 63/1466
709/224

(Continued)

OTHER PUBLICATIONS

Rahbarinia, "Segugio: Efficient Behavior-Based Tracking of Maware-Control Domains in Large ISP Networks", 2015 45th Annual | IEEE/IFIP International Conference on Dependable Systems and Networks (Year: 2015).*

(Continued)

*Primary Examiner* — Ghodrat Jamshidi
(74) *Attorney, Agent, or Firm* — VanLeeuwen & VanLeeuwen; Daniel C. Housley

(57) ABSTRACT

A cloud based implemented method (and apparatus) includes receiving input data including bipartite graph data in a format of source MAC (Media Access Control) address data versus destination IP (Internet Protocol) data and timestamp information, and providing the input bipartite graph data into a first processing to detect malicious beaconing activities using a lockstep detection module on the input bipartite graph data, as executed in a cloud environment, to detect possible synchronized attacks against a targeted infrastructure.

17 Claims, 5 Drawing Sheets

(52) U.S. Cl.
CPC ...... *H04L 63/1425* (2013.01); *H04L 63/1441* (2013.01); *H04L 2463/144* (2013.01)

(56) References Cited

U.S. PATENT DOCUMENTS

| | | | |
|---|---|---|---|
| 9,043,894 | B1 | 5/2015 | Dennison et al. |
| 9,241,010 | B1* | 1/2016 | Bennett ............... H04L 63/1416 |
| 10,305,921 | B2* | 5/2019 | Gao .................... H04L 63/1425 |
| 2003/0002484 | A1* | 1/2003 | Freedman ................ H04L 9/40 370/352 |
| 2009/0171954 | A1* | 7/2009 | Liu ..................... G06F 16/9027 |
| 2010/0163621 | A1* | 7/2010 | Ben-Asher ............. G05D 1/104 235/412 |
| 2012/0278021 | A1* | 11/2012 | Lin ........................ G06F 17/10 702/85 |
| 2013/0306276 | A1 | 11/2013 | Duchesneau |
| 2013/0346467 | A1* | 12/2013 | Rosu .................. G06F 16/9024 709/201 |
| 2014/0259156 | A1 | 9/2014 | Beutel et al. |
| 2016/0226819 | A1* | 8/2016 | Manadhata ......... H04L 61/4511 |
| 2017/0024983 | A1* | 1/2017 | Reeves ................. G08B 13/02 |
| 2017/0063912 | A1 | 3/2017 | Muddu et al. |

OTHER PUBLICATIONS

Amini, "Botnet Detection using Netflow and Clustering", ACSIJ Advances in Computer Science: an International Journal, vol. 3, Issue 2, No. 8 , Mar. 2014 (Year: 2014).*

Jiang, "Suspicious Behavior detection: Current Trends and Future Directions", IEEE Intelligent Systems, Jan./Feb. 2016 (Year: 2016).*

Xin Hu, et al., "Baywatch: Robust Beaconing Detection to Identify Infected Hosts in Large-Scale Enterprise Network", proceedings of the IEEE/IFIP International Conference on Dependable Systems and Network and Networks (DSN), 2016, p. 479-490.

Jayanta Mondal, et al., "EAGr: Supporting Continuous Ego-Centric Aggregate Queries over Large Dynamic Graphs", Proceedings of the 2014 ACM SIGMOD.

Leman Akoglu, et al., "Oddball: Spotting Anomalies in Weighted Graphs", Pacific-Asia Conference of Knowledge Discovery and Data Mining Springer Berlin Heidelberg, 2010.

Bum Jun Kwon, et al., "Catching Worms, Trojan Horses and PUPs: Unsupervised Detection of Silent Delivery Campaigns", Submitted to NDSS 2017, pp. 1-9.

* cited by examiner

DETECTING MALICIOUS BEACONING COMMUNITIES USING LOCKSTEP DETECTION AND CO-OCCURRENCE GRAPH

CROSS-REFERENCE TO RELATED APPLICATIONS

The present application is a Continuation Application of U.S. patent application Ser. No. 15/626,767, filed on Jun. 19, 2017, the entire contents of which are hereby incorporated by reference.

BACKGROUND

The present invention relates generally to cyber security and, more specifically, two processes, each using a different graph data format and a community detection mechanism, prioritize potential malicious beaconing activities from existing, detected beaconing results, to reduce the number of false positives in the cyber security analysis.

SUMMARY

In an exemplary embodiment, the present invention can provide a computer-implemented method including receiving input data comprising bipartite graph data in a format of source ID (e.g., MAC (Media Access Control) address) data versus destination ID (e.g., IP (Internet Protocol) address) data and timestamp information, the source ID data comprising an identification of devices within a targeted infrastructure and the destination ID data comprising an identification of external destination servers possibly involved in malicious beaconing activities; providing the input bipartite graph data into a first processing to detect malicious beaconing activities using a lockstep detection method on the input bipartite graph data, as executed by a processor on a computer, to detect possible synchronized attacks against a targeted infrastructure, each synchronized attack comprising a set of devices in the targeted infrastructure communicating with a same set of external destination servers within a specific time window; and the input bipartite graph data is provided into a second processing executed by the processor, the second processing initially converting the bipartite graph data into a co-occurrence graph format that indicates in a graph format how devices in the targeted infrastructure communicate with different external destination servers over time, the second processing detecting malicious beaconing activities by analyzing data exchanges with the external destination servers over a plurality of the time windows, using the data in the co-occurrence graph format.

Other exemplary embodiments provide a system and a computer program product that implement this computer-implemented method.

BRIEF DESCRIPTION OF THE DRAWINGS

Aspects of the invention will be better understood from the following detailed description of exemplary embodiments of the invention with reference to the drawings, in which.

DETAILED DESCRIPTION

Figure 3:
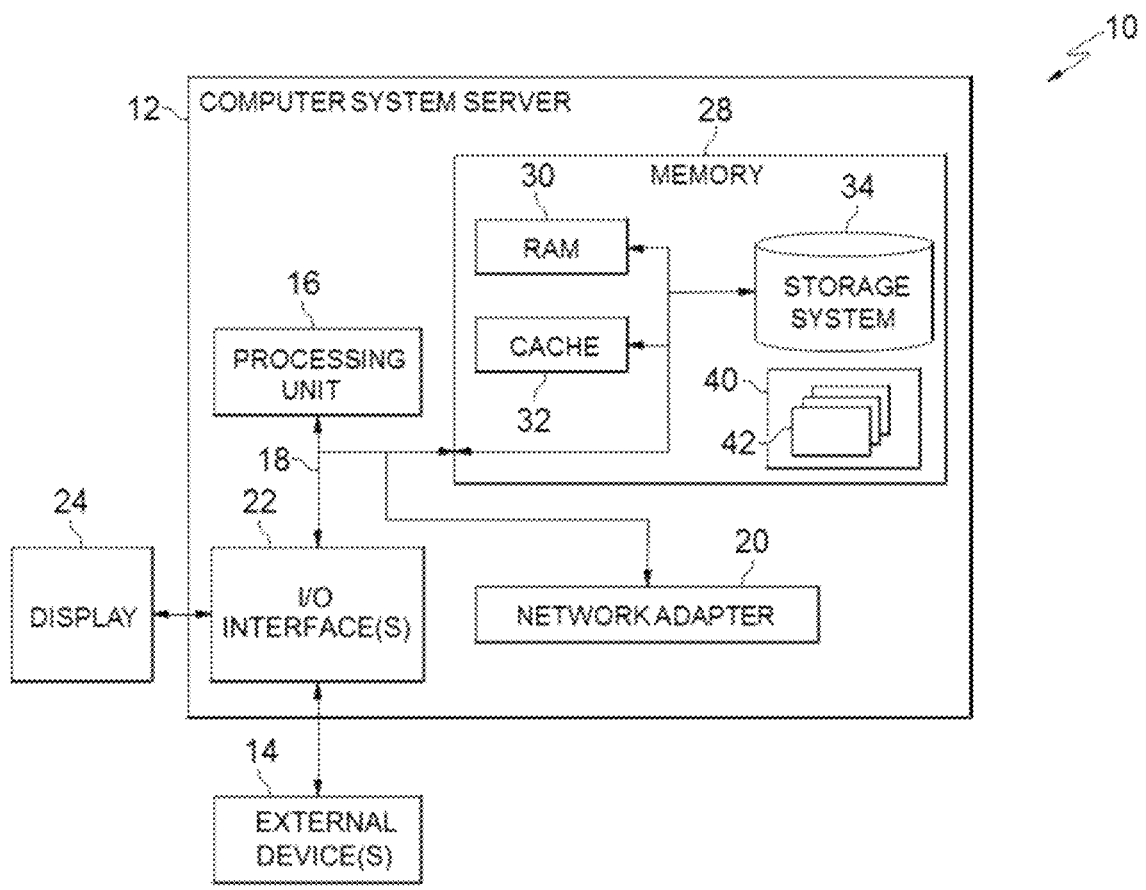
FIG. 3 depicts a cloud computing node according to an embodiment of the present invention.
Figure 4:
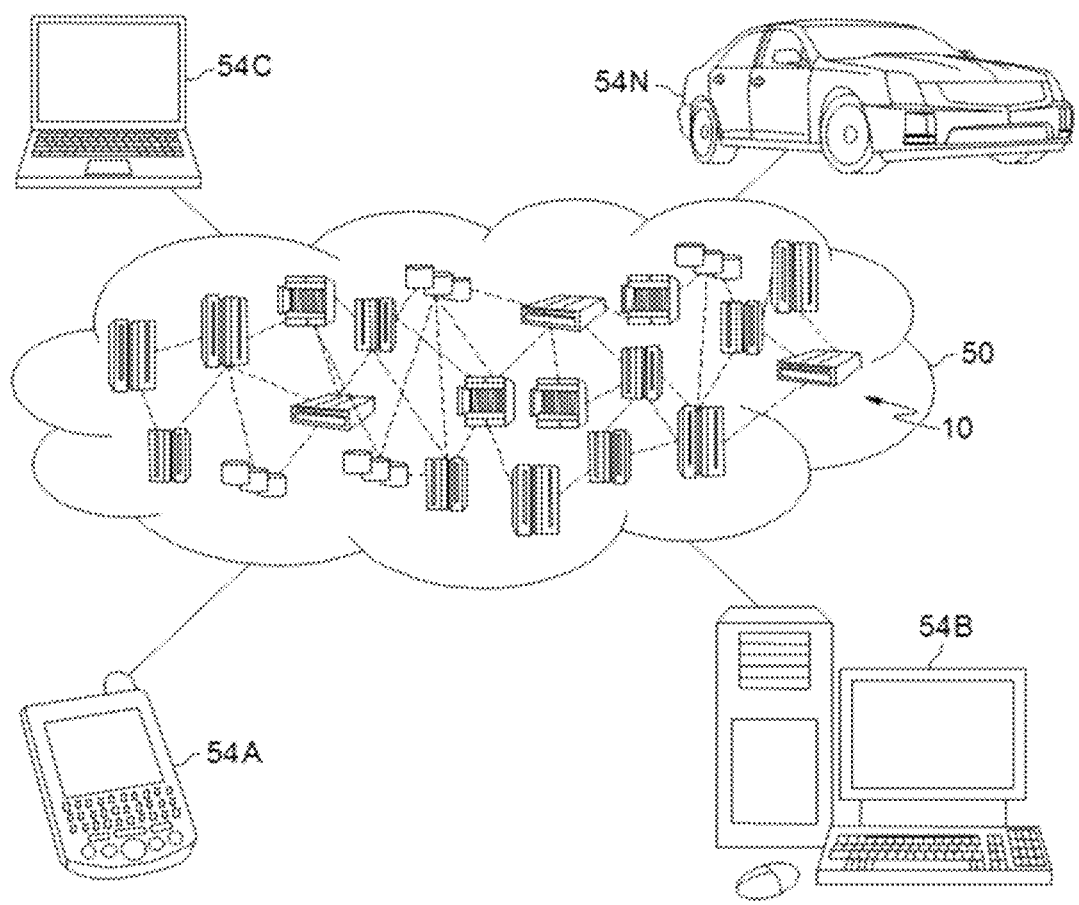
FIG. 4 depicts a cloud computing environment according to an embodiment of the present invention.
Figure 5:
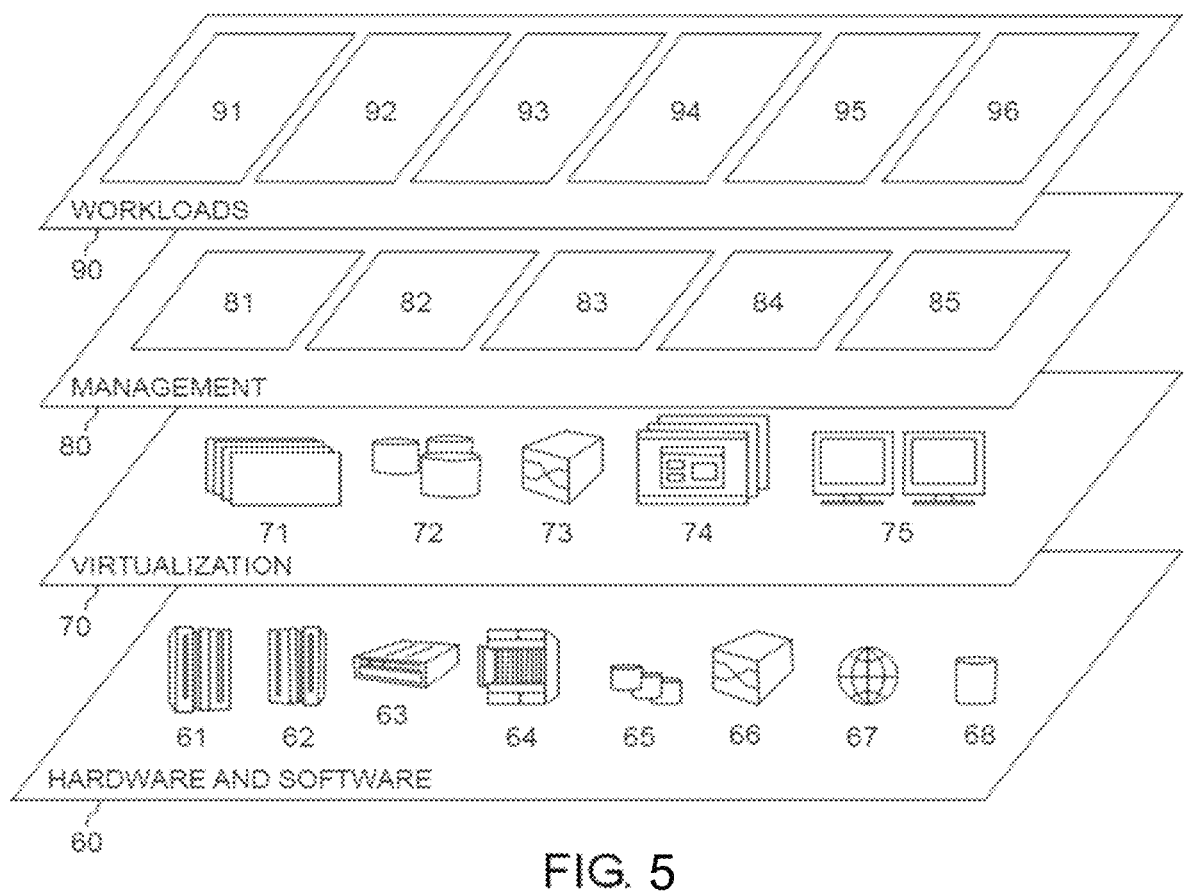
FIG. 5 depicts abstraction model layers according to an embodiment of the present invention.

The invention will now be described with reference to FIGS. 1-5, with FIGS. 3-5 demonstrating a non-limiting exemplary implementation as a cloud service.

Cyber security threats, such as Advanced Persistent Threats (APTs) and targeted attacks, are sophisticated and extremely challenging to detect, as explained in, for example, "BAYWATCH: Robust Beaconing Detection to Identify Infected Hosts in Large-Scale Enterprise Networks" by Hu, et al., an article having a listing of authors including various of the co-inventors of the present invention. The content of this reference is hereby incorporated herein by reference.

Such APT attacks involve three phases. In a first phase, one or more devices within a target infrastructure is/are initially compromised. In the second phase, a communication channel is established that enables the threat actor to remotely control the compromised devices within the target infrastructure. The third phase involves the execution of the mission of the attack, such as access to and exfiltration of sensitive data or disturbance of a process within the target infrastructure.

Thus, once one or more devices in the target infrastructure have been infected in an APT attack, the adversary then establishes a stealthy communication channel between the malware process and the adversary's command and control (C&C) infrastructure located outside the perimeter of the target infrastructure. However, relative to the problem being addressed by the present invention, such network interactions from the infected devices within the targeted infrastructure also provide a defender with an opportunity to detect the presence of the APT attack by detecting the beaconing behavior when the malware in the infected infrastructure device reaches out to the C&C infrastructure on a regular basis to confirm its presence in the target infrastructure and to get further instructions.

Beaconing can be described as a regular sequence of requests or beacons, sometimes highly periodic, sometimes not. Depending upon the attacker's strategy, the frequency of sending beacons might be slow and stealthy, or fast and aggressive.

Detection of beaconing activity is not trivial, and regular beaconing behavior may not be malicious, since some network behavior that resembles beaconing is actually a mundane and legitimate activity, such as regular update checks verifying software versions or antivirus signatures, license checks, and e-mail or news polling, etc. In contrast to benign activity that repeatedly accesses the same server-side infrastructure, malicious campaign activity typically involves a high domain churn, since malicious actors are attempting to evade blacklists that would occur if they remain on the same server for extended periods.

One conventional and effective solution using this detection strategy, as described in the above-identified publication, focuses on an eight-step filtering process. This system, referred to therein as "BAYWATCH", detects periodic callback signals between a compromised machine and a command and control server for identifying infected hosts in large-scale enterprise networks. The BAYWATCH system has been demonstrated to reliably identify beaconing behavior and separate legitimate beaconing from malicious beaconing. However, large amounts of beaconing signals are generated each day (for example, 50 k/day), which may include false positives, such as benign software updates.

The present invention addresses this problem of prioritization in detecting malicious callback signals between a compromised device in a target infrastructure and a command and control server by using two techniques 100, 102 that prioritize malicious beaconing activities to further filter the large amount of potential beaconing data. Each of these two processes has its own filtering capability and could be used separately and alone. However, in a preferred exemplary embodiment, the two techniques 100, 102 work together as two processings executed in parallel, using the same initial input data but entirely different processing methods on the same input data, with data conversion occurring to suit each technique. Such combination of methods provides additional confidence than would result from executing only one of the two methods alone. Although each method uses different data processing, both processes include a community detection mechanism for detecting attack campaigns and infrastructure potentially controlled by the same threat actors.

The present invention evolved from the recognition by the present inventors that graph analytics can be used to assist in more precisely identifying malicious activities from existing, detected beaconing behavior and to reduce false positives. There are at least three main ideas underlying the present invention. First, the present inventors recognized that beaconing signals that show synchronized activities might be involved in the same attack campaign and more highly malicious, thereby leading to using lockstep detection as demonstrated in the first processing. Second, the present inventors recognized that malicious beaconing signals might communicate with the similar set of destination servers when controlled by the same threat actors, thereby leading to the novel application of community detection in both processing, as well as developing the second processing based on co-occurrence graph data. Third, the present inventors recognized that malicious beaconing destination communities might have different graphical structures from those of benign beaconing destination communities, thereby leading to the anomaly detection and classification of data of the second processing in which data has been converted into co-occurrence graph data.

Figure 1:
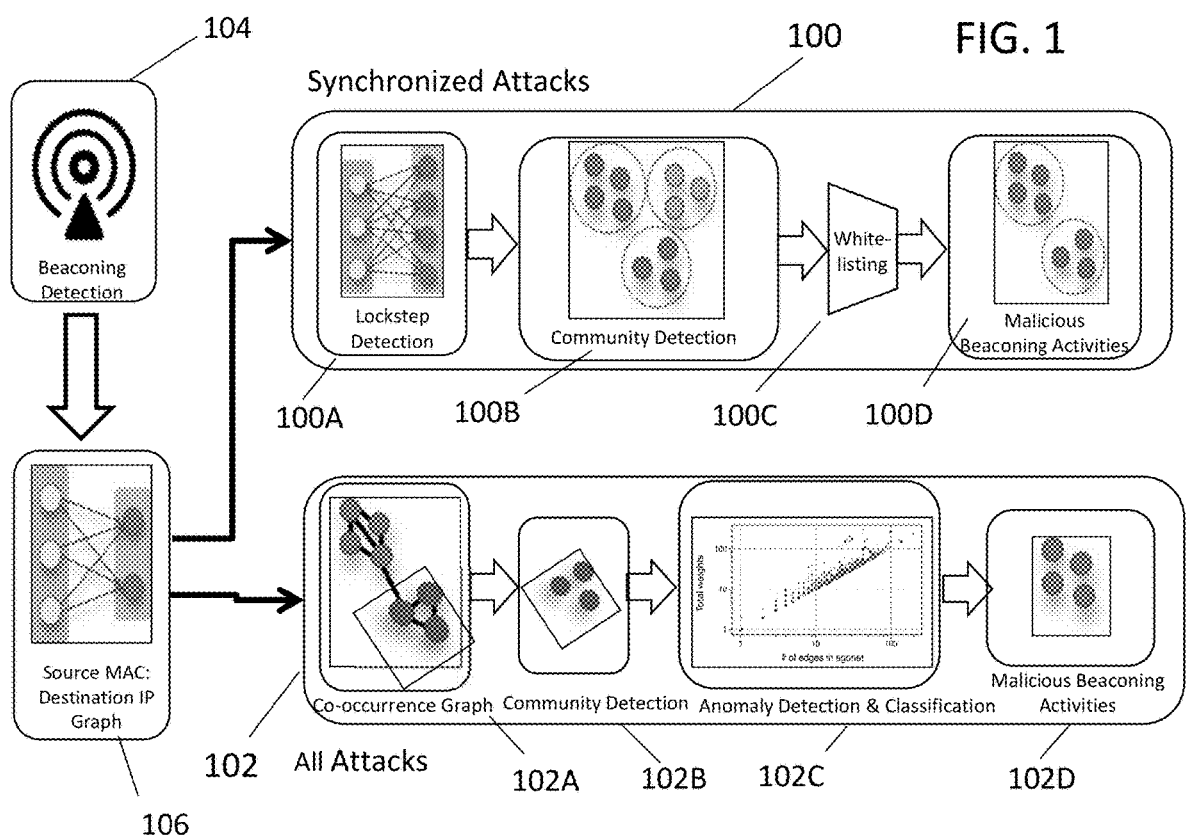
FIG. 1 shows an overview of an exemplary embodiment of the present invention.

As shown in FIG. 1, an exemplary embodiment of the present invention is based upon input data as a listing of potential beacon incidents, as output data from a beacon detector module 104. Such listing of potential beacon incidents could be provided, for example, by the system and method described in U.S. Pat. No. 9,591,007, issued Mar. 7, 2017, the content of which is incorporated herein by reference. This patent '007 describes a system and method for beacon detection as developed by various of the co-inventors of the present invention.

FIG. 1 shows an overview of the two separate processes 100, 102 implementing an exemplary embodiment of the present invention. Data 106 is provided into the two processes 100, 102, as having been provided as output data by the beacon detection module 104, such as described in U.S. Pat. No. 9,591,007. This input data is then initially converted into a graph format including source ID (e.g., MAC (Media Access Control) address) data for the possibly infected infrastructure devices versus destination ID (e.g., IP (Internet Protocol) address) data for external domain servers possibly serving as malicious agents. The input data also includes timestamp information. This graph formatted data becomes input data into both processes 100, 102.

In summary and as shown in FIG. 1, the first process 100 detects synchronized attacks in a targeted infrastructure by first detecting locksteps and then detecting destination communities from these detected locksteps. In the context of the present invention, "synchronized-attacks" refers to attacks detected by identifying a set of devices communicating with the same set of destination servers within a specific time window, demonstrating an attack campaign where these devices are infected with the same malicious software and/or these destination servers are controlled by the same threat actors.

The second process 102, referred to herein as the "all-attacks process", initially converts its input graph data into co-occurrence graph format for evaluating weight/edge features of the destination servers. In the co-occurrence graph format, a node is a destination server and an edge between two nodes denotes that a source device within the targeted infrastructure communicates with these two destinations (e.g., destination domain servers). An edge has higher weight as more source devices communicate with any two specific destination servers. Malicious and legitimate beaconing activities are distinguished in the co-occurrence graph data by detecting anomalous communities in this co-occurrence graph data to determine which communities indicate possible churning of external servers. Specifically, a community detection mechanism based on the weights of edges between nodes is applied to the co-occurrence graph data to decompose the graph into communities.

As noted, both the first and second processes 100, 102 include community detectors, albeit using different formats of input data, since, as mentioned above, malicious actors tend to frequently change malicious servers in order to avoid being listed on a blacklist. The present inventors believe that this present invention is the first time that such community detection techniques have been used to improve the detection of targeted attack campaigns and their malicious infrastructure. Community detection is used in the present invention to reveal more comprehensive view of lockstep communities controlled by the same attacker even if only partially overlapped locksteps are identified, and to distinguish malicious communities from benign communities through anomaly detection.

Turning now to details of the first process, the term "lockstep" in its common meaning describes the form of military marching in which soldiers are close together and all move forward together with the same foot at the same time. In the context of the present invention, this term is intended as a term of art as described in, for example, "*Catching Worms, Trojan Horses and PUPs: Unsupervised Detection of Silent Delivery Campaigns*" by Kwon, et al, the contents of which are incorporated herein by references. In this specific meaning, "lockstep" describes the coordinated behavior that is possible to observe during silent delivery campaigns on targeted infrastructures. A lockstep corresponds to one or more delivery campaigns of the same infrastructure, as indicated by repeated observations of synchronized activity among a group of downloaders (or domains) to retrieve payloads within a bounded time period. Thus, the first stage 100A of the synchronized-attacks process 100 of FIG. 1 is detecting locksteps by looking for transmissions over pre-defined time windows from nodes of a targeted infrastructure to the same set of destination IP servers.

The community detection module 100B of the first process 100 then evaluates which detected lockstep instances are churning their destination servers, and finds lockstep communities by evaluating edge weights among destination nodes, with churning being suggested by locksteps having larger edge weights. Similarly, the community detection module 102B of the second process 102 is a community detection mechanism that evaluates domain server churn by evaluating edge weights on the co-occurrence graph data. In a preferred exemplary embodiment, the community detection function is implemented as a fastgreedy community algorithm because it is efficient and edge weight-based grouping is desirable to identify strongly connected communities.

Although not important to the understanding of the present invention, it is noted that a number of community detection algorithms are known in the art. For example, in addition to the fastgreedy community algorithm used in the exemplary embodiment, other community detection algorithms include the label propagation community algorithm, the leading eigenvector community algorithm, the spinglass community algorithm, the walktrap community algorithm, and the edge betweenness community algorithm. Therefore, it should be clear that the present invention could utilize other community detection algorithms, and the present invention is not intended as being limited to the use of any specific community detection algorithm.

It is further noted that one of the ordinary skills in the art would readily understand that, in the context of the present invention as implemented on a computer in a preferred embodiment, the word "module", as used herein, means a set of instructions, as stored on a non-transitory memory device, and as intended to be selectively executed by a processor on the computer to execute one of the functional components of the present invention. The output of the community detection module 100B is then checked against a whitelist 100C of known non-malicious domains.

The second process 102 begins by converting the input bi-partite graph data into co-occurrence graph data in which graph nodes are destinations and an edge is placed between nodes if they communicated with the same source devices. Edge weights are also maintained. To analyze this format, features of egonets of candidate graphs are extracted so that the anomaly detector & classification module 102B can measure distribution statistics of the extracted features to find out anomalies, with outliers of the weight/edge features being legitimate beaconing signals, since non-malicious servers will tend to show higher edge weights due to content distribution networks (CDNs). Community detection is used in the present invention to identify destinations involved in the attack campaigns by filtering out legitimate servers.

Both processes 100, 102 then provide output results 100D, 102D of malicious beaconing activities, including indication of detected communities.

Figure 2:
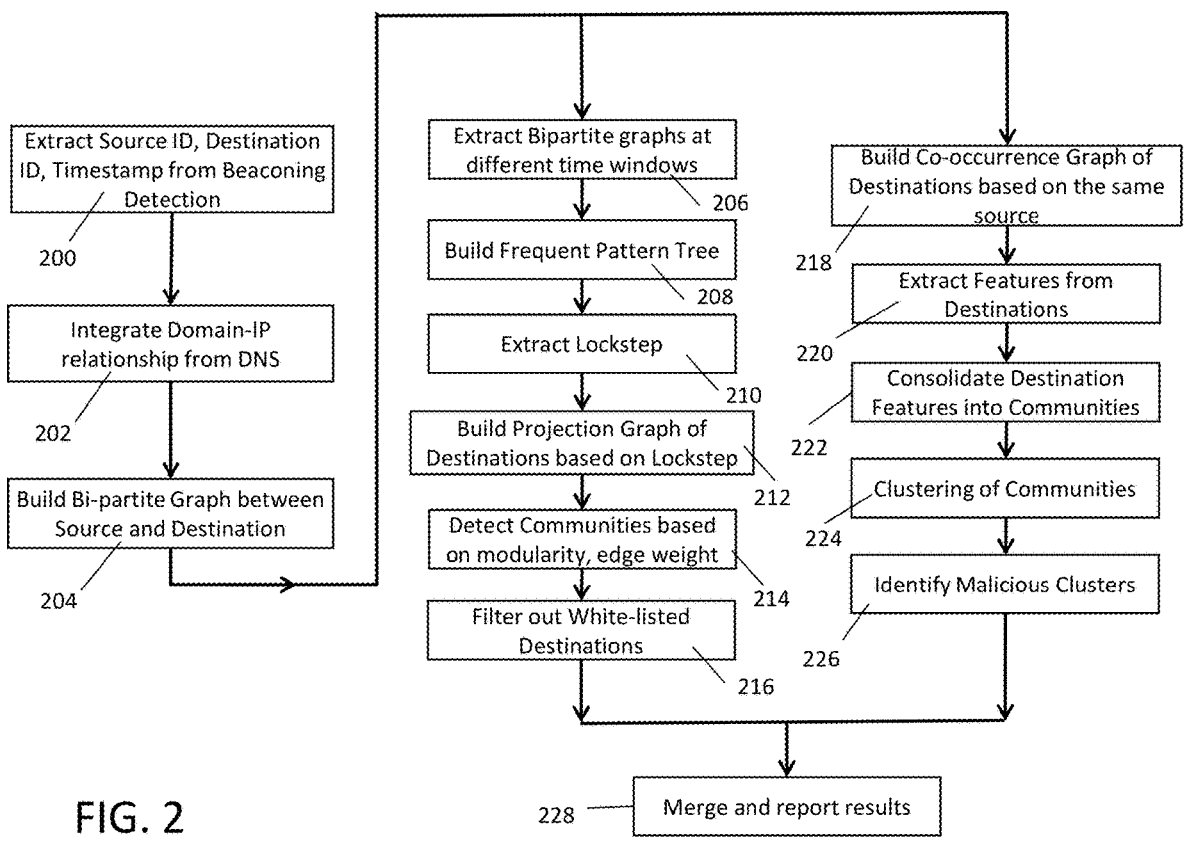
FIG. 2 shows details of the steps of the exemplary embodiment shown in FIG. 1.

FIG. 2 shows additional details of steps of the exemplary embodiment of FIG. 1, as further demonstrating the processing steps of the two processes 100, 102. In step 200, records from the beaconing detection module 106 are parsed in order to extract source and destination IDs, timestamps, and, if available, corresponding domain names. In step 202, domain-IP (Internet Protocol addresses) relationships are integrated, using information from DNS (Domain Name System) if such information was not available from the beaconing detection records.

In step 204, the source/destination data is used to construct bipartite graphs (see 106 in FIG. 1), in which, for example, the left side nodes are source IDs (e.g., source IPs, and MACs (Media Access Control)) and the right side nodes are destination IDs (e.g., destination IPs, and domain names). The bipartite graph data becomes input data for both processes 100, 102 of FIG. 1. For purpose of explaining the mechanism of the present invention and the problem being addressed by the present invention, that of detecting beaconing signals in a target infrastructure, the left side nodes (e.g., the white nodes in FIG. 1) represent machines in the target infrastructure that have possibly been compromised, and the right-side nodes (e.g., the darker nodes) represent remote servers potentially involved in the advanced persistent threat (APT) attack.

The lockstep detection module 100A (FIG. 1) of the first stage of the synchronized attacks process 100 involves three steps 206, 208, 210 in FIG. 2. In step 206, bipartite graphs at different time windows are extracted. In step 208, a frequency pattern tree is constructed, from which the locksteps are extracted in step 210. This lockstep extraction process is similar to the method described in the above-identified article by Kwon, et al., except that the present invention uses different input data from that described in these references and includes timestamp information, e.g., source MAC-destination IP pairs from the reported beaconing signals with timestamps.

Thus, compared to previous frequent pattern tree approaches, such as described, for example, in Mondal, et al., "EAGr: Supporting Continuous Ego-centric Aggregate Queries over Large Dynamic Graphs", the present invention also incorporates temporal information (e.g., timestamps), which is a critical attribute to be able to detect locksteps at certain time windows. That is, if similar locksteps are observed over multiple time windows, it gives more confidence in detection of coordinated attacks.

Similarly, relative to the method described in Kwon et al., the present invention provides some similar techniques in some steps of the first process of the present invention, albeit on different input data. However, the beaconing detection input data of the present invention provides a stronger indication of suspicious activity than does the accessed-by relationship of a download event described in Kwon et al. because regular beaconing signals over a certain time period is an evident sign of suspicious running processes. Even more significant, compared to Kwon's method, the present invention introduces the use of community detection 100B as part of the analysis for malicious infrastructure potentially controlled by the same threat actor. This use of community detection to identify specific malicious campaigns is new in the art.

The community detection module 100B of FIG. 1 is implemented in FIG. 2 in steps 212 and 214, which, in a preferred embodiment, is implemented by a fast greedy community detection processing, detects destination communities from the detected locksteps by identifying strongly connected destinations from the lockset detection stage. The fastgreedy community detection algorithm is efficient and appropriate to group communities based on a parameter such as edge weight, but the present invention is not limited to the use of the fastgreedy community detection algorithm. Edge weight becomes higher if there are more locksteps where two or more nodes (destination servers or destinations) appear in common. Thus, by evaluating edge weights, the community detection module 100B reveals more comprehensive view of lockstep communities generated by the same attacker by grouping partially overlapped locksteps spanning over multiple time windows.

In step 212, the lockstep detection data is used to build projection graphs of destinations, and, in step 214, communities are detected based on modularity and edge weight, which are used to identify strongly connected nodes. For example, modularity is a measure to find optimal communities where nodes within a module are densely connected while nodes across different modules are sparsely connected. Community detection of lockstep data is recognized by the present inventors as being important in the context of the present invention in that one of the results of the synchronized attacks processing of the present invention is a listing of lockstep communities rather than a mere listing of locksteps. The present inventors consider that community detection is a way to detect more complete set of malicious infrastructure involved in attack campaigns and to provide more confidence in detecting malicious activity.

Thus, a key benefit of listing lockstep communities rather than merely locksteps is that more complete pictures of coordinated attacks and malicious infrastructures can be comprehended by combining (potentially) incomplete and partially overlapped locksteps. For example, some devices may be down or inactive during a certain time window, so that those incomplete locksteps cannot be exactly matched across different time windows. Community detection enables the present invention to identify malicious infrastructure controlled by the same threat actor/campaign even as the actor/campaign moves to different domain servers or servers enter/leave the network to, for example, attempt to evade blacklisting since grouping of partially overlapped locksteps provides more comprehensive view of coordinated attacks.

In step 216 the listing of destinations of the community detection module 100B is filtered by deleting those destinations that are found on a whitelist that identifies legitimate communities, such as cloud data backup services. The result of the synchronized-attacks processing is a listing of malicious/suspicious lockstep communities, where each community represents a set of severs that are highly likely involved in attack campaigns such as APT attacks. Corresponding beaconing cases of the first process are reported as malicious activity as part of step 228.

The second process 102 of FIG. 1, the all-attacks processing, begins with a co-occurrence graph stage 102A, as implemented in step 218 of FIG. 2, in which co-occurrence graphs of destinations are built, as based on destinations contacted by the same sources. Edges are placed between destination nodes that communicated with the same source devices, and the weights of the edges are measured based on the number of source devices they communicate in common. It should be clear that the data of this second process 102 is listing of domain servers or sets of domain servers potentially being churned by a malicious actor and that the more churning occurring between the different domain servers would provide lower edge weights relative to benign domain servers that are densely connected, such as content distribution networks (CDNs).

The anomaly detection and classification module 102C of FIG. 1 is implemented in FIG. 2 in steps 220-224. In step 220, egonets of the destinations and features from the destinations (e.g., domain servers) are extracted. For each egonet, the system analyses if an egonet is sparsely or densely connected using the "ratio of #edge to #node" and an average edge weight, by "total edge weight/#edges".

As is well known in the art, an egonet, or ego network, consists of a focal node ("ego") and the nodes within n hops from the ego, where n is an arbitrary but preset integer. Therefore, by measuring the distribution statistics of the extracted features, the destination features can be consolidated into communities in step 222 and, in step 224, the communities can be clustered based on the features. Thus, the second processing also uses a community detection technique, as modified for different input data involving egonet features used to cluster/classify communities. The rationale behind using the egonet parameters is that most benign CDNs (content distribution networks) are highly/densely connected in their infrastructure, whereas malicious actors would churn their destination servers.

For example, the present inventors have found that there were many beaconing cases communicating with Amazon cloud, and this method helps to exclude such highly likely benign cases and prioritize the investigation of malicious beaconing cases. In the small graph 102B of FIG. 1, malicious communities would tend to be those communities that are closest to the slanted line of data points due to low weights, while benign communities would tend to be those communities that are further from this slanted line, as measured by distance along the vertical axis. That is, although not a clear-cut result, the present inventors have recognized that most benign communities had high edge weight and were densely connected. Therefore, in an exemplary embodiment, the identification of malicious clusters in step 226 could be implemented by finding a statistical distribution of cluster distances along the vertical axis to develop a threshold distance for distinguishing malicious clusters from non-malicious clusters. Community detection enables the present invention to identify more complete pictures of infrastructure controlled by the same malicious or legitimate organization, and clustering of communities rather than individual servers provides more reliable classification results to filter out legitimate communities. Community detection is done in a similar way to the technique used in lockstep processing. Then, anomaly detection is used to filter out benign communities.

Exemplary Hardware Aspects, Using a Cloud Computing Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 7, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: conversion of beacon detection data into a source MAC: Destination IP Graph data 91; lockstep detection module 92; community detection module 93; co-occurrence graph conversion module 94; anomaly detection and classification module 95; and the malicious beaconing activities output modules 96 of the present invention, as components shown exemplarily in FIG. 1 that implement the methods shown exemplarily in FIG. 2 and as described in the corresponding text descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicants' intent is to encompass the equivalents of all claim elements, and no amendment to any claim of the present application should be construed as a disclaimer of any interest in or right to an equivalent of any element or feature of the amended claim.

What is claimed is:

1. A cloud-implemented method, comprising:
   providing, as input data, information of a listing of potential beacon incidents as output data from a beaconing detector;
   reformatting the input data into bipartite graph data in a format of source MAC (Media Access Control) address data versus destination IP (Internet Protocol) data and timestamp information;

providing the bipartite graph data as input data into a first processing to detect malicious beaconing activities using a lockstep detection module on the input bipartite graph data, as executed in a cloud environment, to detect possible synchronized attacks against a targeted infrastructure; and providing the bipartite graph data as input data into a second processing to provide community detection by a community detection module of the second processing for processing a community detection mechanism that evaluates a domain server churn by evaluating edge weights on co-occurrence graph data from a co-occurrence graph conversion module.

2. The cloud-implemented method of claim 1, further comprising:

merging results of the first processing and results of the second processing; and providing the merged results as output data from an output module.

3. The cloud-implemented method of claim 1, wherein the first processing further comprises:

extracting bipartite graphs at different time windows;

building a frequency pattern tree, wherein the frequency pattern tree includes temporal information; and detecting lockstep patterns from the frequency pattern tree.

4. The cloud-implemented method of claim 1, wherein the first processing further comprises detecting communities based on at least edge weights of the projection graph data, further comprising providing the input bipartite graph data into the second processing executed in a cloud environment, the second processing initially converting the bipartite graph data into a co-occurrence graph format that indicates in a graph format how devices in a targeted infrastructure communicate with different external destination servers over time, the second processing detecting malicious beaconing activities by analyzing data exchanges with the external destination servers over a plurality of time windows to detect anomalies, using the data in the co-occurrence graph format.

5. The cloud-implemented method of claim 1, wherein the first processing further comprises:

filtering out destinations based on a comparison with a white-list; and providing the filtered destination information as an output of the first processing.

6. The cloud-implemented method of claim 1, wherein the second processing comprises extracting features from egonets of destinations from data in the co-occurrence graph format.

7. An apparatus for cloud-based implementation, comprising:

a processor; and a memory device, wherein the memory device stores a set of instruction permitting the processor to execute a cloud-implemented method of:

providing, as input data, information of a listing of potential beacon incidents as output data from a beaconing detector;

reformatting the input data into bipartite graph data in a format of source MAC (Media Access Control) address data versus destination IP (Internet Protocol) data and timestamp information;

providing the bipartite graph data as input data into a first processing to detect malicious beaconing activities using a lockstep detection module on the input bipartite graph data, as executed in a cloud environment, to detect possible synchronized attacks against a targeted infrastructure; and providing the bipartite graph data as input data into a second processing to provide community detection by a community detection module of the second processing for processing a community detection mechanism that evaluates a domain server churn by evaluating edge weights on co-occurrence graph data from a co-occurrence graph conversion module.

8. The apparatus of claim 7, wherein the processor is further configured to:

merge results of the first processing and results of the second processing; and provide the merged results as output data from an output module.

9. The apparatus of claim 7, wherein the first processing further comprises:

extracting bipartite graphs at different time windows;

building a frequency pattern tree, wherein the frequency pattern tree includes temporal information; and detecting lockstep patterns from the frequency pattern tree.

10. The apparatus of claim 7, wherein the first processing further comprises detecting communities based on at least edge weights of the projection graph data, further comprising providing the input bipartite graph data into the second processing executed in a cloud environment, the second processing initially converting the bipartite graph data into a co-occurrence graph format that indicates in a graph format how devices in a targeted infrastructure communicate with different external destination servers over time, the second processing detecting malicious beaconing activities by analyzing data exchanges with the external destination servers over a plurality of time windows to detect anomalies, using the data in the co-occurrence graph format.

11. The apparatus of claim 7, wherein the first processing further comprises:

filtering out destinations based on a comparison with a white-list; and providing the filtered destination information as an output of the first processing.

12. The apparatus of claim 7, wherein the second processing comprises extracting features from egonets of destinations from data in the co-occurrence graph format.

13. A computer program product comprising a computer readable storage medium having program instructions embodied therewith, the program instructions readable and executable by a computer to cause the computer to perform a method in a cloud-based implementation, comprising:

providing, as input data, information of a listing of potential beacon incidents as output data from a beaconing detector;

reformatting the input data into bipartite graph data in a format of source MAC (Media Access Control) address data versus destination IP (Internet Protocol) data and timestamp information;

providing the bipartite graph data as input data into a first processing to detect malicious beaconing activities using a lockstep detection module on the input bipartite graph data, as executed by a processor on a computer, to detect possible synchronized attacks against a targeted infrastructure; and providing the bipartite graph data as input data into a second processing to provide community detection by a community detection module of the second processing for processing a community detection mechanism that evaluates a domain server churn by evaluating edge weights on co-occurrence graph data from a co-occurrence graph conversion module.

14. The computer program product of claim 13, further comprising:
   merging results of the first processing and results of the second processing; and
   providing the merged results as output data from an output module.

15. The computer program product of claim 13, wherein the first processing further comprises:
   extracting bipartite graphs at different time windows;
   building a frequency pattern tree, wherein the frequency pattern tree includes temporal information; and
   detecting lockstep patterns from the frequency pattern tree.

16. The computer program product of claim 13, wherein the first processing further comprises detecting communities based on at least edge weights of the projection graph data, further comprising providing the input bipartite graph data into the second processing executed in a cloud environment, the second processing initially converting the bipartite graph data into a co-occurrence graph format that indicates in a graph format how devices in a targeted infrastructure communicate with different external destination servers over time, the second processing detecting malicious beaconing activities by analyzing data exchanges with the external destination servers over a plurality of time windows to detect anomalies, using the data in the co-occurrence graph format.

17. The computer program product of claim 13, wherein the first processing further comprises:
   filtering out destinations based on a comparison with a white-list; and
   providing the filtered destination information as an output of the first processing,
   wherein the second processing comprises extracting features from egonets of destinations from data in the co-occurrence graph format.

\* \* \* \* \*